United States Patent
Lin

[11] Patent Number: 6,116,305
[45] Date of Patent: Sep. 12, 2000

[54] ROTARY CUTTER

[76] Inventor: Chang-Piao Lin, No. 17, Nan-Yang-Hsin Village, Nan-Yang Rd., Fengyuan City, Taichung Hsien, Taiwan

[21] Appl. No.: 09/422,649

[22] Filed: Oct. 22, 1999

[51] Int. Cl.[7] .................................................. B27G 13/00
[52] U.S. Cl. .......................... 144/221; 144/218; 144/230; 407/41
[58] Field of Search .................... 144/218, 221, 144/229, 230, 241; 407/41, 48

[56] References Cited

U.S. PATENT DOCUMENTS

| | | | |
|---|---|---|---|
| 2,355,865 | 8/1944 | Hofbauer | 144/221 |
| 2,576,607 | 11/1951 | Knudson et al. | 144/221 |
| 3,785,417 | 1/1974 | Vora | 144/230 |
| 4,074,737 | 2/1978 | Stewart | 144/230 |
| 4,684,297 | 8/1987 | Funakawa et al. | 144/230 |
| 4,830,073 | 5/1989 | De Abreu | 144/221 |
| 4,893,662 | 1/1990 | Gervasi | 144/230 |

*Primary Examiner*—W. Donald Bray
*Attorney, Agent, or Firm*—Rabin & Champagne, P.C.

[57] ABSTRACT

A rotary cutter is disclosed. The rotary cutter includes a roller having a plurality of flutes defined in the periphery thereof, and a plurality of blades arranged on the periphery of the roller along each of the flutes. Each of the flutes has a pair of helical sections that branch outward and forward from a junction and extend around the periphery of the roller.

2 Claims, 4 Drawing Sheets

ROTARY CUTTER

BACKGROUND OF THE INVENTION

1. Field of the Invention

The present invention relates to a rotary cutter and, more particularly, to an improved rotary cutter in which sawdust and wood chips can be effectively removed from the cutter with a single extractor.

2. Description of Related Art

As shown in FIGS. 3 and 4, a wood planer (400) typically includes at least one rotary cutter (30) rotatably arranged therein for cutting a piece of wood, and a collecting system (40) disposed over the rotary cutter (30) for collecting the sawdust and wood chips from the cut wood.

The collecting system (40) has a plurality of extractor hoods (41), each communicating with a collector (not shown) through a hose as shown in phantom line in FIG. 3. An inlet (42) is situated substantially over the longitudinal midpoint of the rotary cutter (30) and communicates with the extractor hoods (41).

When the rotary cutter (30) is rotated, the sawdust and wood chips cut from the work piece move along a plurality of flutes (31) defined in the periphery of the rotary cutter (30), and are removed from the cutter (30) via the inlet (42).

In the conventional rotary cutter, the flutes (31) are configured as helical grooves (32) that extend from a first end to a second end of the cutter (30). As the rotary cutter (30) has a length beyond the coverage of the single inlet (42), sawdust and wood chips moving from the cutter (30) towards the second end will never be sucked away but will instead be ejected from the cutter (30) in the direction as denoted by the arrow A in FIG. 4.

The ejected sawdust and wood chips will then fly about contaminating the local atmosphere, eventually falling and accumulating within the wood planer (400), causing inconvenience to the operator.

One of the resolutions to the problem is to provide multiple extractor inlets (42) one by one over the rotary cutter (30). However, this arrangement of multiple extractor inlets (42) is complicated and makes the cutting process of the wood planer (400) costly.

Therefore, it is an objective of the invention to provide an improved rotary cutter to mitigate and/or obviate the aforementioned problems.

SUMMARY OF THE INVENTION

The object of the present invention is to provide an improved rotary cutter in which sawdust and wood chips can be effectively removed from the cutter with a single extractor inlet.

Other objects, advantages and novel features of the invention will become more apparent from the following detailed description when taken in conjunction with the accompanying drawings.

DETAILED DESCRIPTION OF THE PREFERRED EMBODIMENT

Figure 1:
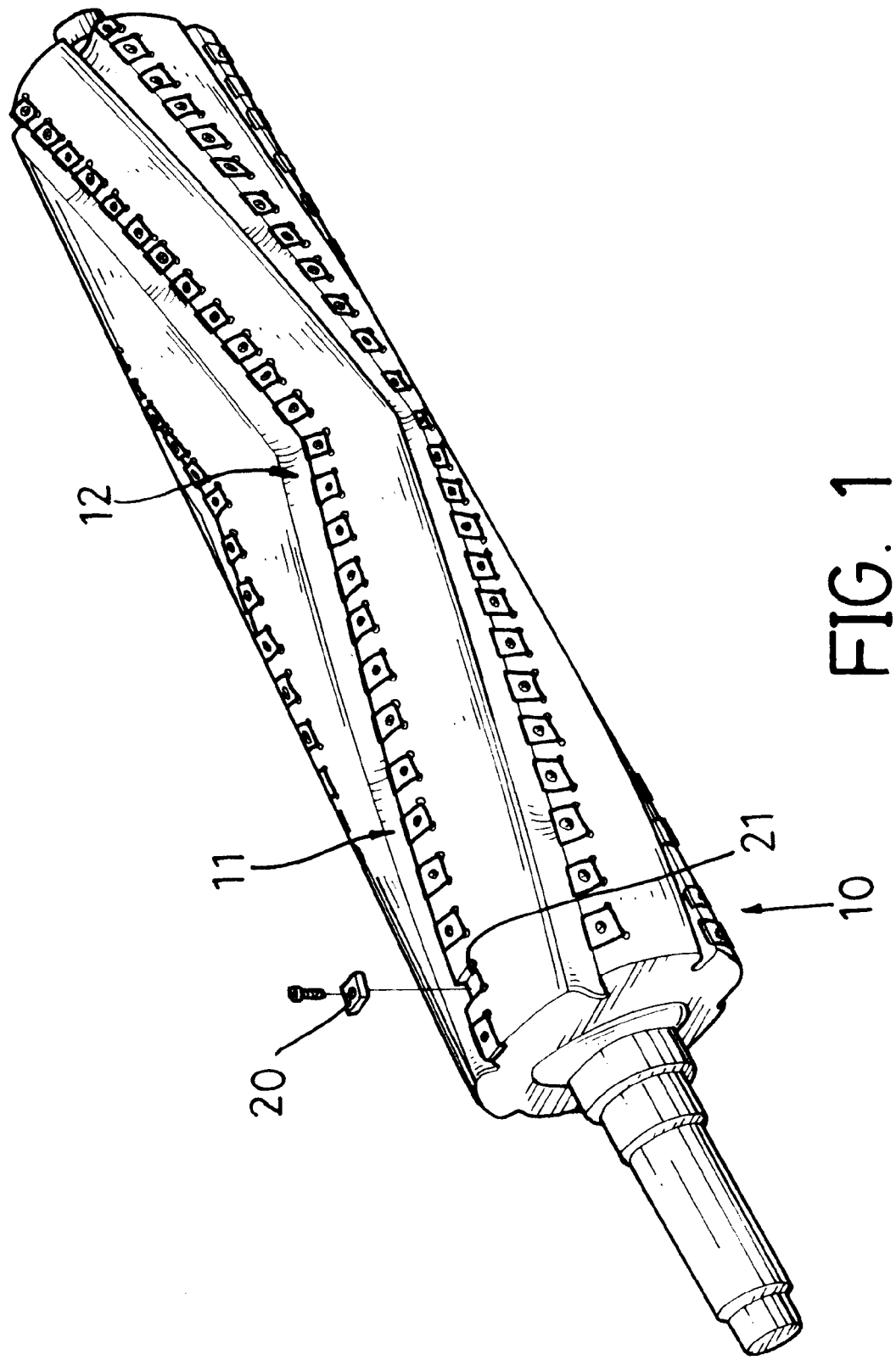
FIG. 1 is a perspective view of preferred embodiment of a rotary cutter in accordance with the present invention.

Referring to FIG. 1, an improved rotary cutter constructed in accordance with the present invention includes a roller (10) and a plurality of blades (20) arranged on the periphery of the roller (10).

The roller (10) defines in the periphery thereof a plurality of flutes (11), each having a pair of helical sections parts branching from a junction (12), which is preferably located in a longitudinal midpoint of the roller (10). The helical sections of each flute (11) extend backward around the periphery of the roller (10) with respect to the rotational direction of the roller (10) and inward with respect to end faces of the roller (10). Preferably, the flutes (11) are attributed uniformly in the peripheral direction of the roller (10).

Each of the blades (20) is a body having a front face, a major flank and a cutting edge formed at the intersection between the front face and the major flank.

The blades (20) are secured, such as by screws, in respective recesses (21) defined in the periphery of the roller (10) along each of the flutes (11), with the cutting edges thereof situated peripherally over respective flutes (11) and the major flanks thereof slightly projected from the periphery of the roller (10). Preferably, the major flank of each blade (20) is oriented to form a relief angle with a board to be cut when the blade (20) is cutting the board.

Figure 2:
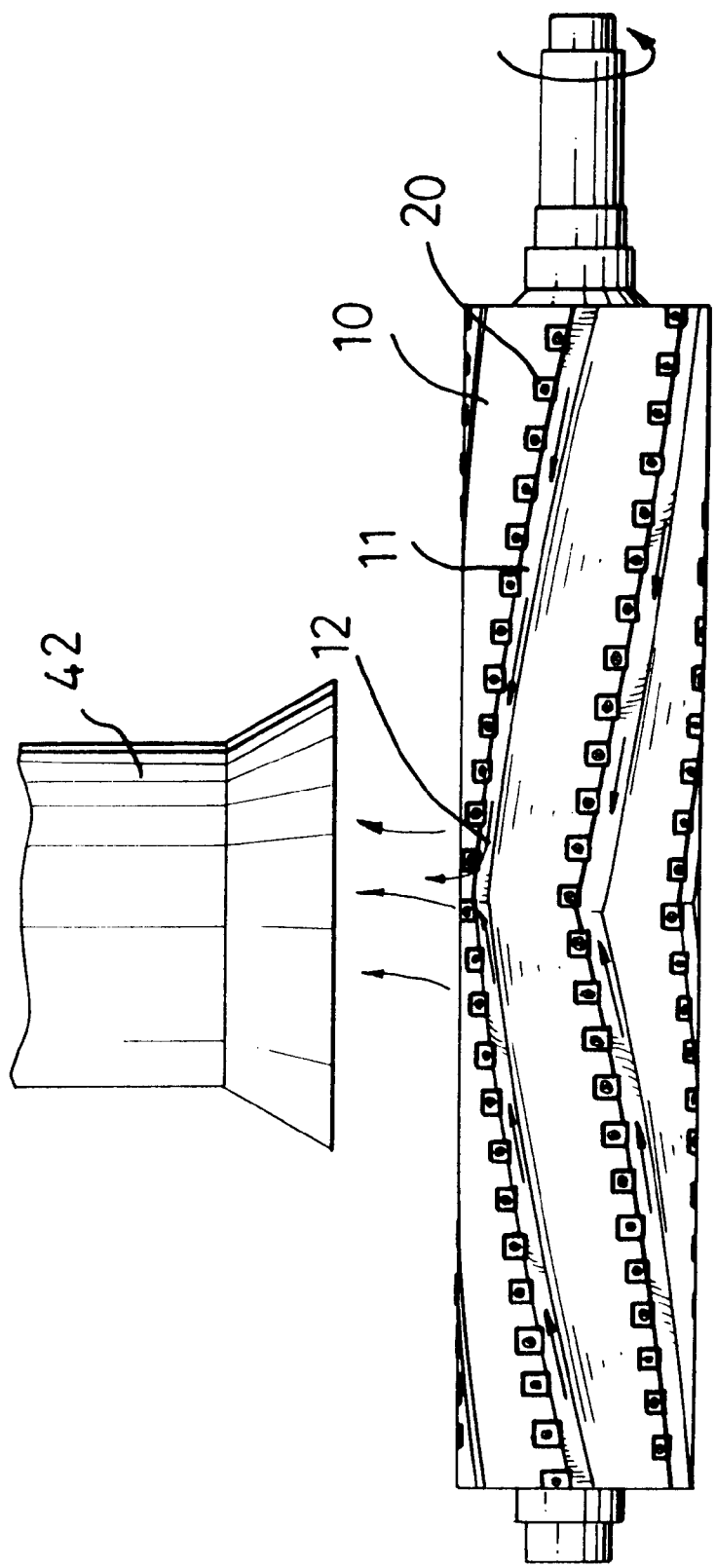
FIG. 2 is a front view of the rotary cutter shown in FIG. 1, with an extractor inlet disposed thereabove.
Figure 3:
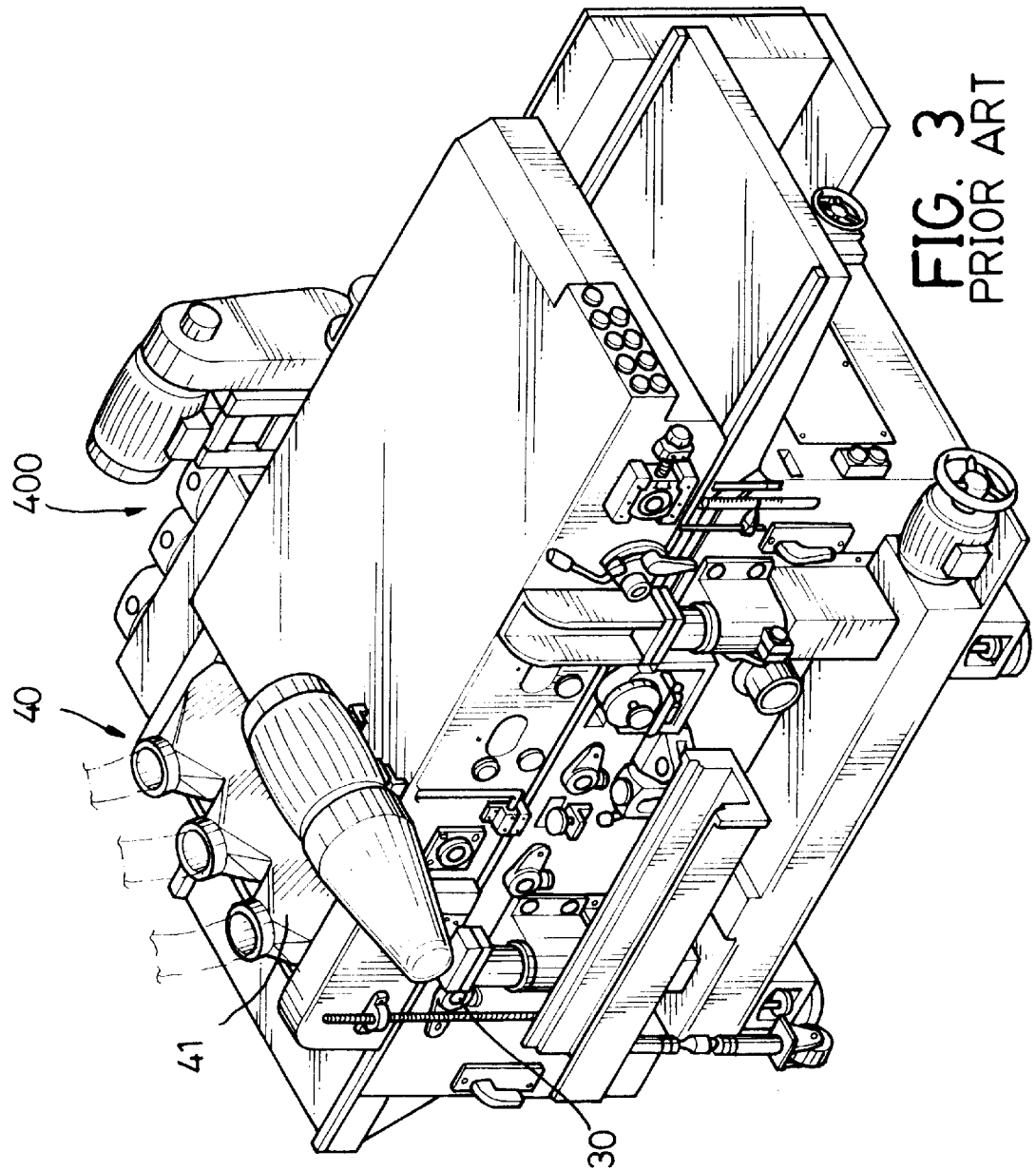
FIG. 3 is a perspective view of a conventional wood planer.
Figure 4:
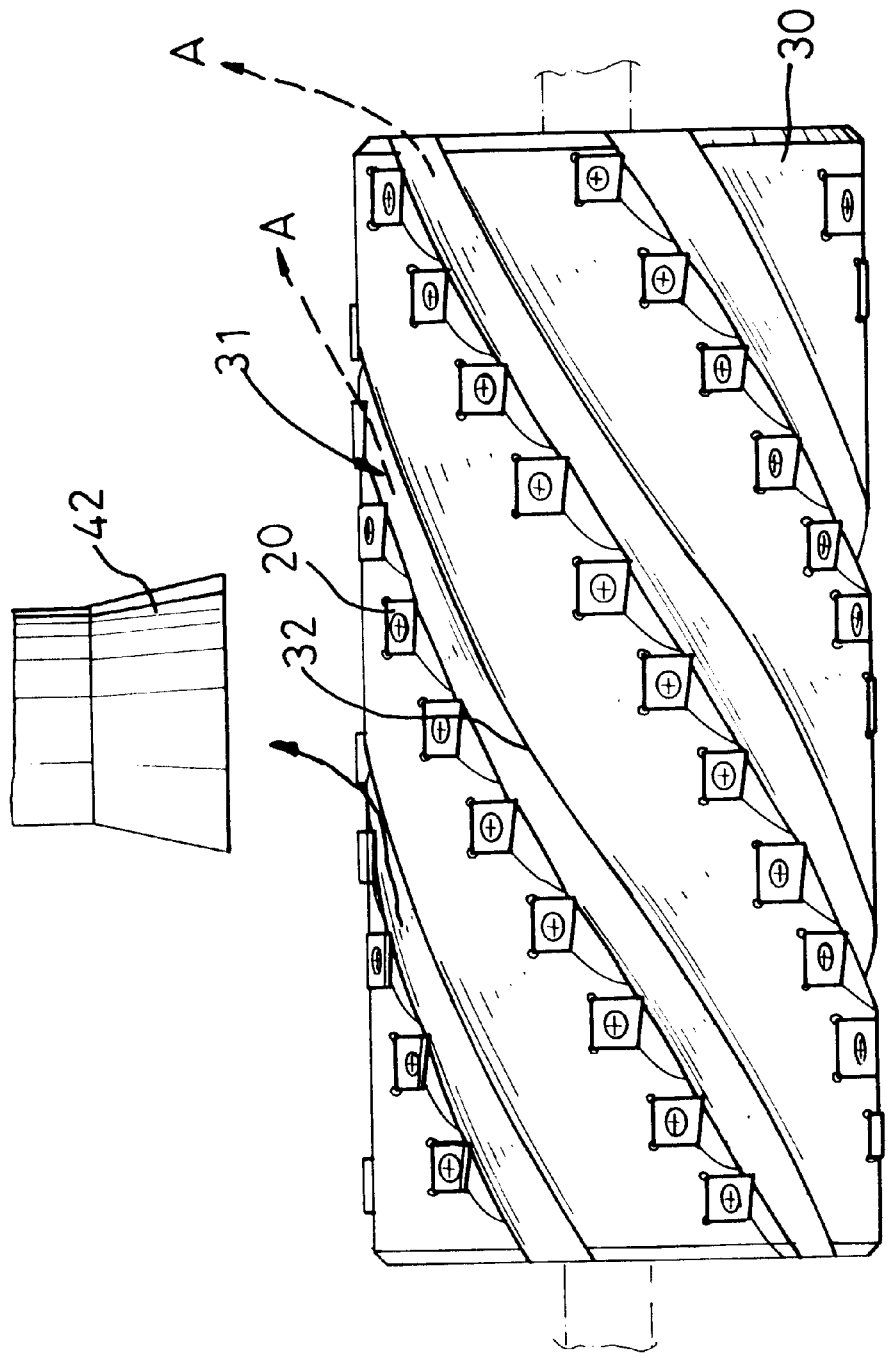
FIG. 4 is a front view of a rotary cutter and an extractor inlet both used in the conventional wood planer of FIG. 3.

Referring to FIG. 2, when the rotary cutter of the present invention rotates, the sawdust and wood chips cut from the board slide over the front faces of the blades (20) into the flutes (11), and are then pushed towards the junctions (12) along the helical sections of the flutes (11) by subsequent sawdust and wood chips.

In this manner, the sawdust and wood chips pushed to the junctions (12) of the flutes (11) can be removed from the rotary cutter solely by a single extractor inlet (42), which is situated substantially over the longitudinal midpoint of the roller (10) for extracting sawdust and wood chips.

From the above description, it is noted that the invention has the following advantages:

1. excellent configuration for effectively removing the sawdust and wood chips therefrom:

Because of the efficient extraction method, only insignificant amounts of sawdust and wood chips remain free in the local atmosphere.

2. ability of removing the sawdust and wood chips only with a single extractor:

Because of this ability, the cutting procedure can be performed in a relative low cost.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A rotary cutter comprising:

a roller (10) having a plurality of flutes (11) defined in the periphery thereof;

each of said flutes (11) having two helical parts branching from a junction (12), said helical parts extending the periphery of said roller (10) inward with respect to end faces of said roller (10) and backward with respect to an intended rotational direction of said roller (10); and a plurality of blades (20) arranged on the periphery of said roller (10) and positioned along sides of each of said flutes (11).

2. The improved rotary cutter as claimed in claim 1, wherein said junction (12) of each of said flutes (11) is located substantially in a longitudinal midpoint of said roller (10).

* * * * *